US009721493B2

(12) United States Patent
Imai et al.

(10) Patent No.: US 9,721,493 B2
(45) Date of Patent: Aug. 1, 2017

(54) TOUCH-TYPE INPUT DEVICE

(71) Applicants: KABUSHIKI KAISHA TOKAI RIKA DENKI SEISAKUSHO, Aichi (JP); SMK CORPORATION, Tokyo (JP)

(72) Inventors: Takao Imai, Aichi (JP); Osamu Yoshikawa, Tokyo (JP)

(73) Assignees: KABUSHIKI KAISHA TOKAI RIKA DENKI SEISAKUSHO, Aichi (JP); SMK CORPORATION, Tokyo (JP)

( * ) Notice: Subject to any disclaimer, the term of this patent is extended or adjusted under 35 U.S.C. 154(b) by 0 days.

(21) Appl. No.: 14/746,901

(22) Filed: Jun. 23, 2015

(65) Prior Publication Data

US 2015/0379913 A1 Dec. 31, 2015

(30) Foreign Application Priority Data

Jun. 26, 2014 (JP) ................................ 2014-131711

(51) Int. Cl.
*G09G 3/20* (2006.01)
*G06F 3/041* (2006.01)
*G06F 3/044* (2006.01)

(52) U.S. Cl.
CPC ............... *G09G 3/20* (2013.01); *G06F 3/044* (2013.01); *G06F 3/0416* (2013.01); *G06F 3/0418* (2013.01)

(58) Field of Classification Search
CPC ......... G09G 3/20; G06F 3/0418; G06F 3/044; G06F 3/0416
See application file for complete search history.

(56) References Cited

U.S. PATENT DOCUMENTS 9,170,322 B1 * 10/2015 Anderson ............. G06F 3/0418
2013/0176268 A1 * 7/2013 Li .......................... G06F 3/044
345/174

(Continued)

FOREIGN PATENT DOCUMENTS

| | | |
|---|---|---|
| EP | 2631744 | 8/2013 |
| JP | 2010-9321 | 1/2010 |

OTHER PUBLICATIONS

Extended European Search Report for EP Pat. App. No. 15173279.9 having a mailing date of Nov. 17, 2015.

*Primary Examiner* — Lun-Yi Lao
*Assistant Examiner* — Kelly Hegarty
(74) *Attorney, Agent, or Firm* — Greenblum & Bernstein, P.L.C.

(57) ABSTRACT

A touch-type input device includes a touch panel. Capacitors are formed at intersections of drive electrodes and sensor electrodes in the touch panel. A controller determines whether the touch panel has been touched from data values, each indicating a change amount in the capacitance from a reference value. When detecting from the data values a change in the capacitance to a reverse polarity differing from the polarity when a human body touches the touch panel, the controller determines that external noise caused the change and stops detecting touching of the touch panel. When the controller detects a change in the capacitance to the reverse polarity, at the same time, the location of where the capacitance of the reverse polarity is detected does not shift, the controller determines that the change in the capacitance is irrelevant to influence of external noise and continues to detect touching of the touch panel.

1 Claim, 3 Drawing Sheets

(56) References Cited

U.S. PATENT DOCUMENTS

| | | | | | |
|---|---|---|---|---|---|
| 2014/0098039 | A1* | 4/2014 | Oda | H03K 17/9622 | 345/173 |
| 2014/0125623 | A1* | 5/2014 | Atkinson | G06F 3/044 | 345/174 |
| 2015/0332647 | A1* | 11/2015 | Kurasawa | G02F 1/133514 | 345/88 |
| 2015/0339988 | A1* | 11/2015 | Kurasawa | G09G 3/20 | 349/37 |

* cited by examiner

TOUCH-TYPE INPUT DEVICE

CROSS-REFERENCE TO RELATED APPLICATIONS

This application is based upon and claims the benefit of priority from prior Japanese Patent Application No. 2014-131711, filed on Jun. 26, 2014, the entire contents of which are incorporated herein by reference.

FIELD

The present invention relates to a touch-type input device.

BACKGROUND

Japanese Laid-Open Patent Publication No. 2010-9321 describes a touch-type input device including a touch panel that is touched to operate virtual buttons shown on a display. In the touch-type input device, for example, a user touches an operation surface of the touch panel to select one of a plurality of functional items presented on the display. This allows the user to view the desired interface on the display or operate an onboard device. Such touching of the touch panel includes, in addition to a simple touch of the operation surface, swiping or flicking of the operation surface in which a finger is moved along the operation surface in a single direction. By swiping or flicking the operation surface, the interface shown on the display is scrolled.

Such a touch panel may implement projected capacitive technology. A projected capacitance type touch panel includes drive electrodes and sensor electrodes that are arranged in a grid-shaped pattern. Capacitors are formed at the intersecting points of the drive electrodes and the sensor electrodes. Touching of the touch panel is detected from the capacitance of each capacitor. A mutual capacitance type touch panel detects a touched position based on changes in the capacitance of each capacitor. The mutual capacitance type touch panel is advantageous in that a number of touch positions may be simultaneously detected.

SUMMARY

External noise, such as electromagnetic waves, may affect the capacitors of the touch-type input device and randomly change the capacitance of a capacitor between two polarities (positive and negative). In such a case, it would become difficult to determine whether touching of the touch panel or external noise caused the change in capacitance. This hinders accurate detection of touching operations.

One aspect of the present invention is a touch-type input device including a touch panel and a controller. The touch panel includes a sensor array and an operation surface. The sensor array includes drive electrodes and sensor electrodes insulated from and stacked on the drive electrodes. The drive electrodes and the sensor electrodes are arranged in a grid-shaped pattern that forms capacitors at intersections of the drive electrodes and the sensor electrodes. The controller applies a drive signal to the drive electrodes and detects touching of the operation surface of the touch panel from changes in a capacitance of each capacitor. The controller determines whether or not the operation surface has been touched from data values, each indicating a change amount in the capacitance of each capacitor from a reference value of each capacitor. When the controller detects from the data values a change in the capacitance to a reverse polarity differing from the polarity when a human body touches the operation surface of the touch panel, the controller determines that the change in the capacitance is caused by external noise and stops detecting touching of the operation surface. When the controller detects a change in the capacitance to the reverse polarity, at the same time, the location of where the capacitance to the reverse polarity is detected does not shift, the controller determines that the change in the capacitance is irrelevant to influence of external noise and continues to detect touching of the operation surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a touch-type input device will now be described with reference to FIGS. 1 to 5.

Figure 1:
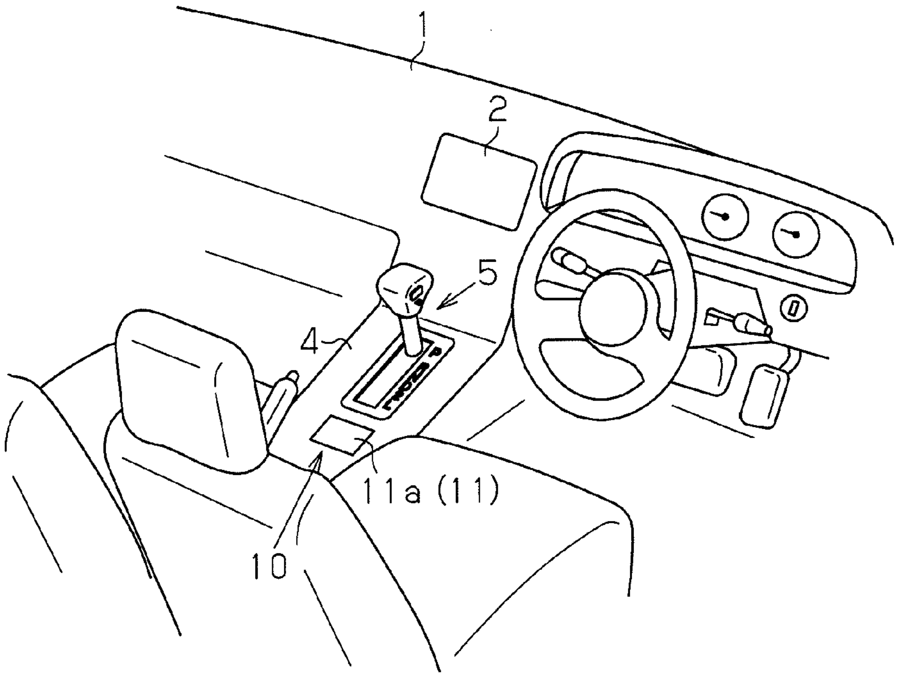
FIG. 1 is a perspective view showing a touch-type input device installed in a vehicle.

Referring to FIG. 1, a dashboard 1 includes a central portion (center cluster) where a display 2 is set. A center console 4 includes a shift lever 5 and a touch-type input device 10. The touch-type input device 10 includes a touch panel 11 that is set on the center console 4 at the rear side of the shift lever 5. The touch panel 11 includes an operation surface 11*a*. In the present embodiment, the touch-type input device 10 is installed in a vehicle but may be installed in other machines. A user touches the operation surface 11*a* of the touch panel 11 with a conductor, such as a finger or a stylus, to select the desired functional item shown on the display 2 and accordingly operate an onboard device, such as an air conditioner or a car navigation system. Touching of the touch panel 11 includes, in addition to a simple touch of the operation surface 11*a*, swiping or flicking of the operation surface 11*a* in which a finger is moved along the operation surface in a single direction.

Figure 2:
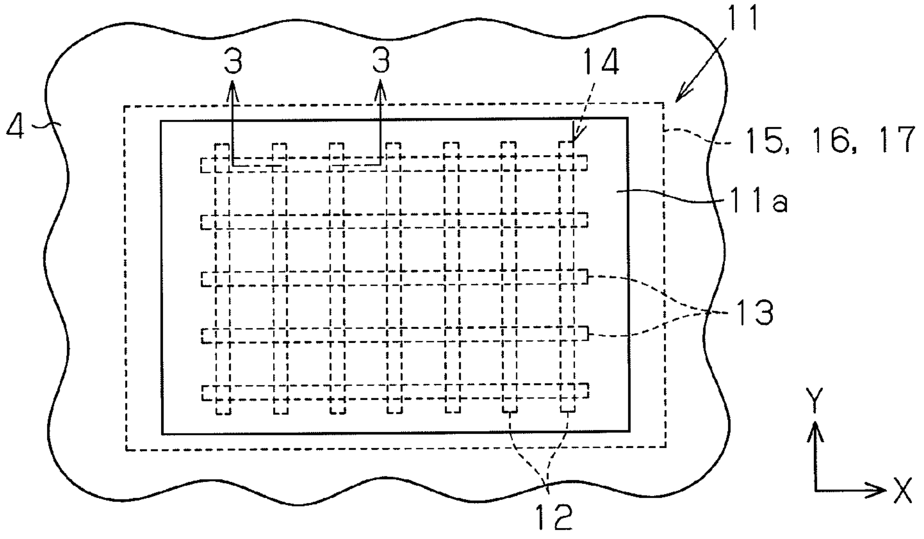
FIG. 2 is a plan view showing an operation surface of a touch panel in the touch-type input device.

As shown in FIG. 2, the touch panel 11 includes a sensor array 14. The sensor array 14 includes drive electrodes 12 and sensor electrodes 13, which are stacked on and insulated from the drive electrodes 12. The drive electrodes 12 and the sensor electrodes 13 are arranged in a grid-shaped pattern that forms capacitors (FIG. 3) at the intersections of the drive electrodes 12 and the sensor electrodes 13. For the sake of brevity, FIG. 2 shows only seven of the drive electrodes 12 and five of the sensor electrodes 13.

Figure 3:
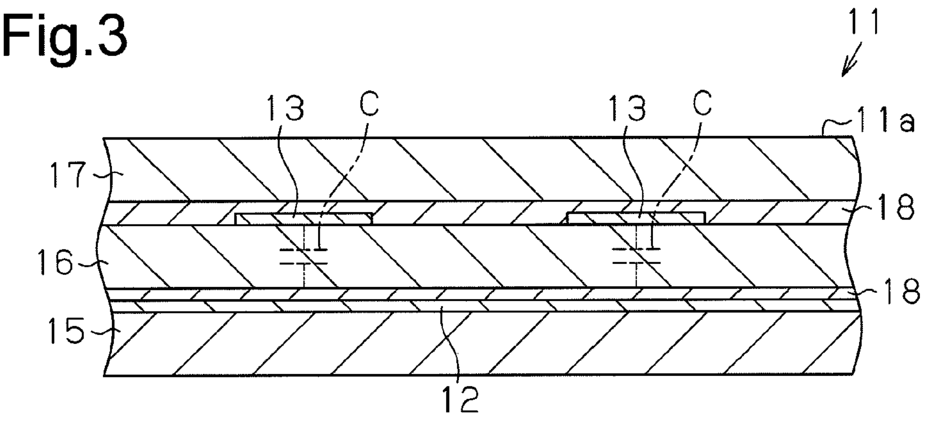
FIG. 3 is a cross-sectional view taken along line 3-3 in FIG. 2.

Referring to FIG. 3, the drive electrodes 12 are arranged on a drive substrate 15. The sensor electrodes 13 are arranged on a sensor substrate 16, which is stacked on the drive substrate 15. A cover 17 is set on the sensor substrate 16. The drive substrate 15, the sensor substrate 16, and the cover 17 are each formed from an insulative material. The cover 17 includes an upper surface that partially forms the operation surface 11*a* of the touch panel 11.

The drive electrodes 12 and the sensor electrodes 13 are each formed from strips of a conductive material. The drive electrodes 12 are arranged adjacent and parallel to one another in a first direction (X direction) within the area of the drive substrate 15 that corresponds to the operation surface 11*a*. The sensor electrodes 13 are arranged adjacent and parallel to one another in a second direction (Y direction), which is orthogonal to the first direction, within the area of the sensor substrate 16 that corresponds to the operation surface 11*a*. Consequently, the drive electrodes 12 and the sensor electrodes 13 form the sensor array 14, which has a grid-shaped pattern, in the operation surface 11*a*. Further, as shown by the broken lines in FIG. 3, the intersections of the drive electrodes 12 and the sensor electrodes 13 form capacitors C. In the present embodiment, an adhesive agent 18 is used to fix the drive electrodes 12 to the drive substrate 15 and the sensor electrodes 13 to the sensor substrate 16.

Figure 4:
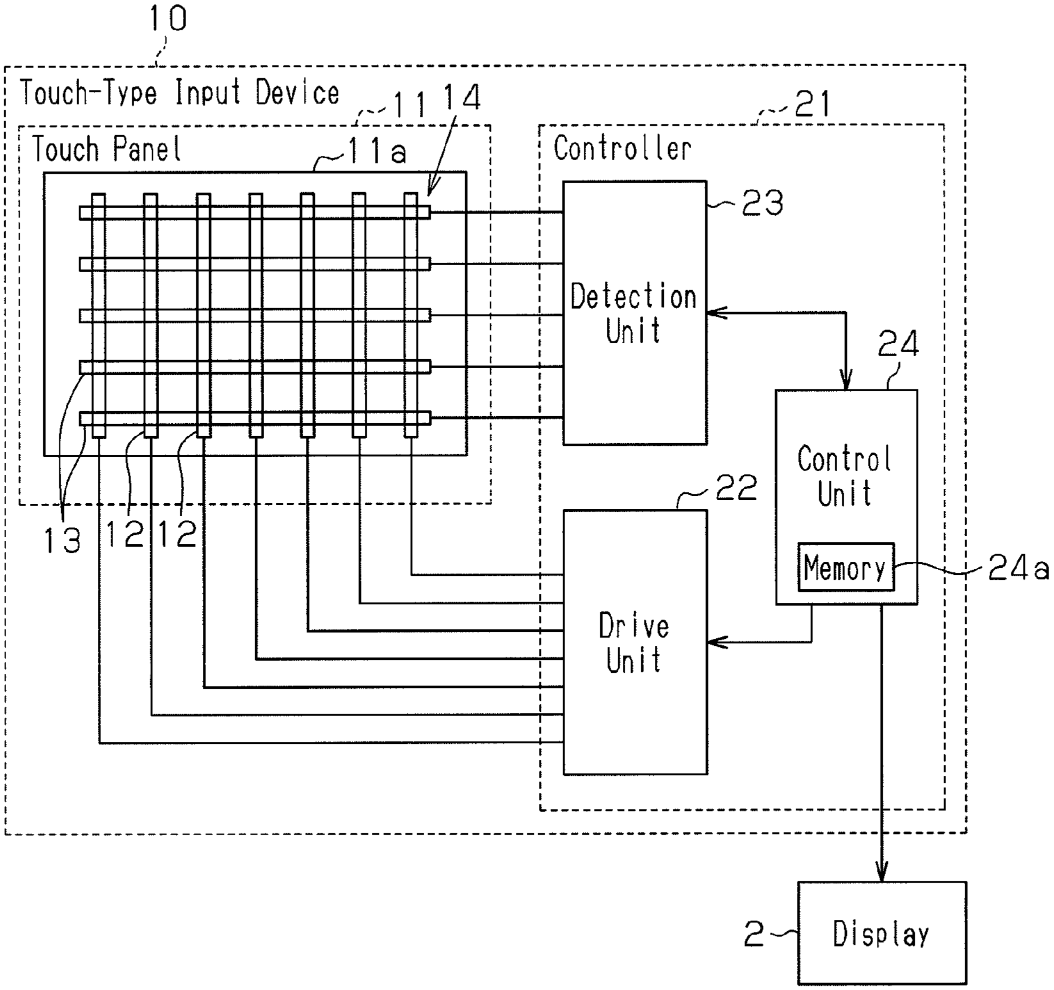
FIG. 4 is a schematic block diagram of the touch-type input device.

As shown in FIG. 4, the touch-type input device 10 further includes a controller 21 that applies a drive signal (pulse signal) to the sensor array 14 to detect a touch, that is, touching of the operation surface 11*a* of the touch panel 11. The controller 21 of the present embodiment employs the mutual capacitance technology and detects a touched position based on a charge-discharge current generated when the capacitance of each capacitor C changes.

The controller 21 includes a drive unit 22, which is connected to the drive electrodes 12, a detection unit 23, which is connected to the sensor electrodes 13, and a control unit 24, which controls the drive unit 22 and the detection unit 23. The drive unit 22 selects the drive electrodes 12 at least one at a time in response to a control signal from the control unit 24 and applies a drive signal to the selected drive electrode 12. The detection unit 23 selects the sensor electrodes 13 at least one at a time in response to control signals from the control unit 24 to receive the charge-discharge current flowing through the selected sensor electrode 13 as an output signal in accordance with the drive signal applied to the selected drive electrode 12. Further, the detection unit 23 detects the capacitance of each capacitor C based on the output signal from the corresponding sensor electrode 13 and outputs a detection signal, which indicates a detection value of the capacitance of the capacitor C, to the control unit 24. Then, the control unit 24 detects a touch and a touched position (coordinates) from the detection signal and outputs the detection result to the display 2.

The control unit 24 is capable of detecting touching even when a conductive foreign matter, such as a water droplet or a coin, is contacting the operation surface 11*a*. In the present embodiment, the capacitance changes toward the positive side when a finger or the like contacts the operation surface 11*a*, and the capacitance changes toward the negative side when a conductive foreign matter contacts the operation surface 11*a*.

The control unit 24 includes a memory 24*a*. The memory 24*a* stores an initial reference value, which is set in advance for each capacitor C. The initial reference value is the electrostatic capacitance when there is no object contacting the operation surface 11*a*. That is, the initial reference value is set to 0 (zero). Further, the memory 24*a* stores a control reference value for each capacitor C. In accordance with whether or not a foreign matter exists on the operation surface 11*a* of the touch panel 11, the control reference value of each capacitor C is set to the initial reference value or changed to a reference value that is set based on the detection value of the capacitance output from the detection unit 23.

When the control unit 24 obtains the capacitance (detection signal) of each capacitor C from the detection unit 23, the control unit 24 determines whether or not a conductive foreign matter exists on the touch panel 11, that is, whether or not a foreign matter is contacting the operation surface 11*a* based on raw data values indicating the change amount of the capacitance of each capacitor C from the initial reference value. For example, the control unit 24 determines the existence of a foreign matter when at least one of the raw data values is less than or equal to a foreign matter determination threshold value. The foreign matter determination threshold value is set to a predetermined negative value. When the control unit 24 determines from the raw data values that a foreign matter exists on the touch panel 11, the control unit 24 acquires the capacitance (detection signal) of each capacitor C again from the detection unit 23. Then, the control unit 24 determines from control data values indicating the change amount of the capacitance of each capacitor C from the corresponding control reference value whether or not another conductive foreign matter exists on the touch panel 11, that is, whether or not another foreign matter is contacting the operation surface 11*a*. For example, the control unit 24 determines the existence of a foreign material when at least one of the control data values is less than or equal to the foreign matter determination threshold value. Further, the control unit 24 determines whether or not the touch panel 11 has been touched based on the control data values. For example, the control unit 24 determines that the touch panel 11 has been touched when at least one of the control data values is greater than or equal to a touch determination threshold value. The touch determination threshold value is set to a predetermined positive value.

When the control unit 24 determines from the raw data values that a foreign matter exists on the operation surface 11*a*, the control unit 24 sets the control reference value for each capacitor C to the same value as the capacitance corresponding to the present raw data value (hereafter, referred to as the raw data reference value). When the control reference value is set to the raw data reference value corresponding to the raw data for each capacitor C, the control unit 24 assumes that the capacitance for each capacitor C is zero (0) under a situation in which the foreign matter is in contact with the operation surface 11*a*. Then, the control unit 24 acquires control data values indicating the change amounts in the capacitances of the capacitors C from the corresponding control reference values. When the control unit 24 determines from the raw data values that there is no foreign matter on the operation surface 11*a*, the control unit 24 sets the control reference value of each capacitor C to the initial reference value.

Further, when the control unit 24 determines from the control data values that a foreign matter exists on the operation surface 11*a*, the control unit 24 sets a new control reference value for each capacitor C to the same value as the capacitance corresponding to the present control data value (hereafter, referred to as the control data reference value). When the control reference value is set to the control data reference value corresponding to the control data value of each capacitor C, the control unit 24 assumes that the capacitance for each capacitor C is zero (0) under a situation in which a foreign matter is in contact with the operation surface 11*a*. Then, the control unit 24 acquires new control data values indicating the change amounts in the capacitances of the capacitors C from the corresponding new control reference values. When the control unit 24 determines from the control data values that there is no foreign matter on the operation surface 11*a*, the control unit 24 sets a new control reference value for each capacitor C to the corresponding raw data reference value.

The shifting of operational states in the touch-type input device 10 will now be described with reference to FIG. 5.

Figure 5:
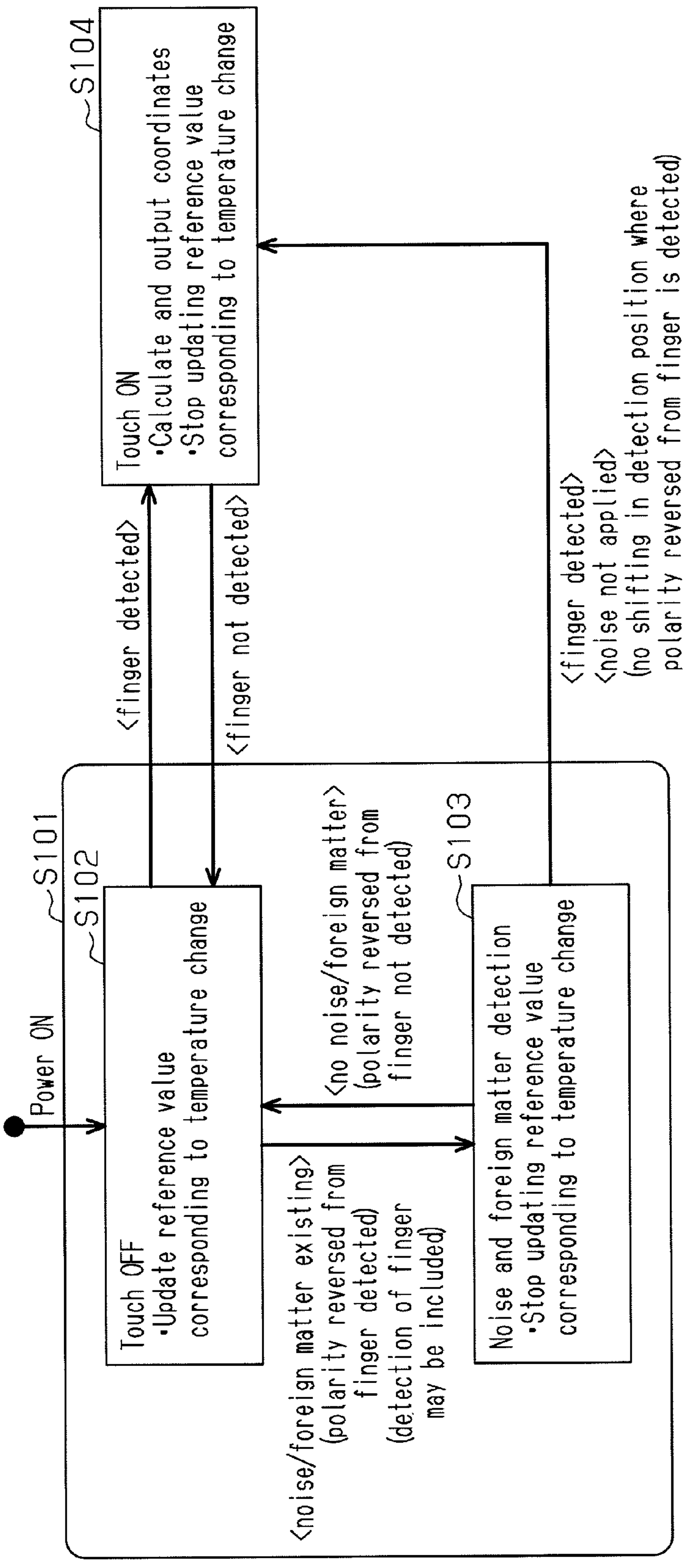
FIG. 5 is a schematic diagram showing the shifting of operational states in the touch-type input device of FIG. 1.

As shown in FIG. 5, when the power goes ON and the touch-type input device 10 is activated, the controller 21 shifts to a detection standby state (step S101). In the detection standby state, the control unit 24 waits for the detection of touching of the operation surface 11*a*.

In a touch OFF state (step S102) in which the operation surface 11*a* is not touched, the control unit 24 performs the detection of noise and foreign matter and the detection of touching operations. The capacitance of each capacitor C is changed by the temperature of the ambient environment. Accordingly, in the touch OFF state, the control unit 24 updates the reference value (initial reference value or control reference value) to a value corresponding to the temperature change. Then, when determining from the raw data values or the control data values that a foreign matter or noise exists on the operation surface 11*a*, the control unit 24 shifts to a noise and foreign matter detection state (step S103). In the noise and foreign matter detection state, if the capacitance changes to a polarity (reverse polarity) differing from the polarity when a human body such as a finger contacts the operation surface 11*a* and, at the same time, the location of where the reverse-polarity capacitance is detected does not shift, the control unit 24 determines that the present change in the capacitance is irrelevant to the influence of noise. That is, the control unit 24 determines that there is no noise. Then, when the control unit 24 determines that the operation surface 11*a* is being touched from the control data values, the control unit 24 shifts to a touch ON state (step S104). In this manner, when, for example, a conductive foreign matter is placed on the operation surface 11*a* or when the sheet state of the operation surface 11*a* changes, the electrostatic capacitances (parasitic capacitances) of the capacitors C change. Even in such cases, the control unit 24 can detect touching and shift to the touch ON state. As described above, this is because the control unit 24 sets the new control reference value of each capacitor C to the control data reference value, that is, the same value as the capacitance corresponding to the present control data when determining from the control data values that a foreign matter is on the operation surface 11*a*.

In the noise and foreign matter detection state, if the capacitance changes to a reverse polarity that differs from the polarity when a human body such as a finger contacts the operation surface 11*a* and, at the same time, the location of where the reverse-polarity capacitance is detected shifts, the control unit 24 determines that there is noise. In this case, the control unit 24 stops detecting the touching of the operation surface 11*a* to limit erroneous touching detections.

In the noise and foreign matter detection state (step S103), when the control unit 24 no longer detects, from the control data values, changes in the capacitance to the reverse polarity that differs from the polarity when a human body touches the operation surface 11*a*, the control unit 24 determines that noise or a foreign matter no longer exists and shifts to the touch OFF state (step S102). A change in the control reference value during the noise and foreign matter detection state would change the change amount of the capacitance (detection value). Accordingly, during the noise and foreign matter detection state, the control unit 24 stops updating the control reference values to reference values corresponding to temperature changes.

In the touch OFF state (step S102), when the control unit 24 determines from the control data values that the operation surface 11*a* is being touched, the control unit 24 proceeds to the touch ON state (step S104). Then, the control unit 24 calculates the coordinates of the location where the operation surface 11*a* has been touched and outputs the coordinates to the display 2.

Further, in the noise and foreign matter detection state (step S103), the control unit 24 also shifts to the touch ON state (step S104) when the control unit 24 determines from the control data values that the operation surface 11*a* is being touched while detecting the existence of a foreign matter. Here, a change in the control reference values during the touch ON state would change the change amount of the capacitance (detection value). Accordingly, during the touch ON state, the control unit 24 stops updating the control reference values to reference values corresponding to temperature changes.

In this manner, the touch-type input device 10 of the present embodiment limits detection of erroneous operations by stopping the detection of the touching of the operation surface 11*a* when external noise exists. Further, if the capacitance changes to a reverse polarity that differs from the polarity when the human body contacts the operation surface 11*a* and the location of where the reverse-polarity capacitance is detected does not shift, the touch-type input device 10 determines that the present capacitance change is irrelevant to the influence of noise. Thus, the touch-type input device 10 continues the detection of the touching of the operation surface 11*a*. In this manner, the touch-type input device 10 is able to detect touching operations regardless of the influence of noise.

The present embodiment has the advantages described below.

(1) If the capacitance changes to a polarity (reverse polarity) differing from the polarity when a human body such as a finger contacts the operation surface 11*a*, something other than the human body may be contacting the operation surface 11*a* or there may be external noise. Accordingly, when a reverse-polarity capacitance is detected and the location where the reverse-polarity capacitance is detected shifts, the control unit 24 determines that there is external noise and thus does not use the present detection value of the capacitance. This reduces erroneous touching detections that would be caused by external noise. As a result, noise resistance can be improved. The location where a reverse-polarity capacitance is detected shifts when external noise is applied. Thus, when the location where a reverse-polarity capacitance is detected does not shift, the control unit 24 determines that there is no external noise. More specifically, the control unit 24 determines that the change in the present capacitance is irrelevant to external noise and caused by contact with a foreign matter or a change in the state of the operation surface 11*a*. Thus, touching of the operation surface 11*a* may be correctly detected even when the operation surface 11*a* is touched by a wet finger or the like and the capacitance changes to a reverse polarity that differs from the polarity when the human body contacts the operation surface 11*a*.

(2) Correction of the control reference values in correspondence with changes in the temperature allows touching of the operation surface 11*a* to be correctly detected. Further, correction of the control reference values is stopped upon detection of a change in the capacitance caused by external noise. This limits situations in which touching cannot be correctly detected when the change amount (detection value) of the capacitance changes.

It should be apparent to those skilled in the art that the present invention may be embodied in many other specific forms without departing from the spirit or scope of the invention. Particularly, it should be understood that the present invention may be embodied in the following forms.

In the above embodiment, the control unit 24 determines that a foreign matter exists when at least one of the raw data values become less than or equal to the foreign matter threshold value. However, foreign matter may be detected from the raw data values under other conditions. For example, the control unit 24 may determine that a foreign matter exists when at least one of the raw data values becomes less than or equal to the foreign matter threshold value and at least another one of the raw data values becomes greater than or equal to a positive threshold value. In the same manner, foreign matter may be detected from the control data values under other conditions. The same applies for the detection of touching operations, and the touching detection may be performed under a condition other than at least one of the control data values being greater than or equal to the touch determination threshold value.

In the above embodiment, the raw data reference values are set to be the same as the raw data values obtained when determining that a foreign matter is in contact with the operation surface 11*a*. However, the raw data reference values do not have to be values that are completely the same as the raw data values as long as they correspond to the control data values. Further, the initial reference values do not have to be values that are completely the same as the capacitances when there is no object contacting the operation surface 11*a*.

In the above embodiment, a foreign matter is detected from the raw data values, and the touching of the operation surface 11*a* is detected from the control data values. However, without changing the reference values in accordance with whether or not a foreign matter exists, the determination of whether or not the operation surface 11*a* has been touched may be performed using the raw data values that show the change amount of the capacitance from the initial reference value in each capacitor C.

The present examples and embodiments are to be considered as illustrative and not restrictive, and the invention is not to be limited to the details given herein, but may be modified within the scope and equivalence of the appended claims.

What is claimed is:

1. A touch-type input device comprising:

a touch panel including a sensor array and an operation surface, wherein the sensor array includes drive electrodes and sensor electrodes insulated from and stacked on the drive electrodes, wherein the drive electrodes and the sensor electrodes are arranged in a grid-shaped pattern that provide capacitors at intersections of the drive electrodes and the sensor electrodes; and a controller that applies a drive signal to the drive electrodes and detects touching of the operation surface of the touch panel from changes in a capacitance of each capacitor, wherein the controller is configured so that:

the controller determines whether or not the operation surface has been touched from data values, each indicating a change amount in the capacitance of each capacitor from a reference value of each capacitor;

when the controller detects from the data values a change in the capacitance to a reverse polarity differing from a polarity when a human body touches the operation surface of the touch panel and the location of the capacitance of the reverse polarity is shifted, the controller determines that the change in the capacitance is caused by external noise and stops detecting touching of the operation surface;

when the controller detects a change in the capacitance to the reverse polarity and at the same time the location of where the capacitance of the reverse polarity is detected does not shift, the controller determines that the change in the capacitance is irrelevant to influence of external noise and caused by contact with at least one of a foreign matter and a change in a state of the operation surface and continues to detect touching of the operation surface;

the controller corrects the reference value in correspondence with a change in temperature when the operation surface is untouched; and the controller stops correcting the reference value in correspondence with a change in temperature when the controller detects a change in the capacitance due to external noise.

* * * * *